United States Patent [19]
Badejo et al.

[11] Patent Number: 5,698,024
[45] Date of Patent: Dec. 16, 1997

[54] ORGANIC PIGMENT COMPOSITIONS

[75] Inventors: Ibraheem T. Badejo, N. Charleston; Daphne J. Rice, Charleston, both of S.C.

[73] Assignee: Bayer Corporation, Pittsburgh, Pa.

[21] Appl. No.: 777,102

[22] Filed: Dec. 31, 1996

[51] Int. Cl.$^6$ .............................................. C09B 48/00
[52] U.S. Cl. ........................... 106/495; 106/497; 106/498
[58] Field of Search ................................ 106/495, 497, 106/498

[56] References Cited

U.S. PATENT DOCUMENTS

| | | | |
|---|---|---|---|
| 3,418,322 | 12/1968 | Tulagin et al. | 260/279 |
| 3,446,641 | 5/1969 | Mitchell et al. | 106/288 |
| 3,635,981 | 1/1972 | Weinberger | 260/279 |
| 4,088,507 | 5/1978 | Tanaka et al. | 106/288 |
| 4,197,404 | 4/1980 | Johnson | 546/49 |
| 4,256,507 | 3/1981 | Kranz et al. | 106/288 Q |
| 4,310,359 | 1/1982 | Ehashi et al. | 106/288 Q |
| 4,439,240 | 3/1984 | Ganci | 106/288 Q |
| 4,455,173 | 6/1984 | Jaffe | 106/288 W |
| 4,478,968 | 10/1984 | Jaffe | 524/88 |
| 4,541,872 | 9/1985 | Jaffe | 106/309 |
| 4,844,742 | 7/1989 | Jaffe | 106/448 |
| 4,895,948 | 1/1990 | Jaffe et al. | 546/56 |
| 4,895,949 | 1/1990 | Jaffe et al. | 546/56 |
| 5,137,576 | 8/1992 | Macholdt et al. | 106/495 |
| 5,194,088 | 3/1993 | Bäbler et al. | 106/412 |
| 5,264,032 | 11/1993 | Dietz et al. | 106/411 |
| 5,286,863 | 2/1994 | Bäbler et al. | 546/56 |
| 5,334,727 | 8/1994 | Campbell | 548/373 |
| 5,368,641 | 11/1994 | Dietz et al. | 106/495 |
| 5,424,429 | 6/1995 | Hendi et al. | 546/49 |
| 5,453,151 | 9/1995 | Bäbler et al. | 106/497 |
| 5,457,203 | 10/1995 | Hendi et al. | 546/56 |

FOREIGN PATENT DOCUMENTS

| | | |
|---|---|---|
| 1544839 | 4/1976 | United Kingdom . |
| 2009205 | 6/1979 | United Kingdom . |

*Primary Examiner*—Deborah Jones
*Assistant Examiner*—Amy M. Harding
*Attorney, Agent, or Firm*—Joseph C. Gil; Richard E. L. Henderson

[57] ABSTRACT

This invention relates to pigment compositions comprising an organic pigment treated with about 0.1 to about 20% by weight, based on the organic pigment, of a compound having the formula (I)

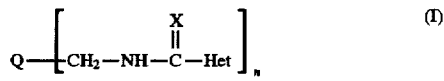

wherein
Q represents an organic pigment moiety,
X is O or S,
Het represents a heteroaromatic group attached at a ring carbon atom to the (thio)amidomethyl —CH$_2$—NH—CX— linking group, and
n is from 1 to 4.

10 Claims, No Drawings

ORGANIC PIGMENT COMPOSITIONS

BACKGROUND OF THE INVENTION

This invention relates to pigment compositions obtained by treating organic pigments with heteroarylamidomethyl and/or heteroarylthioamidomethyl pigment derivatives that impart improved rheological properties and dispersibility.

Many types of organic pigments are known and each can be prepared by one or more known methods. Typically, however, the initially formed crude compounds are unsuitable for use as pigments and must undergo one or more additional finishing steps to modify the particle size, particle shape, or crystal structure to achieve suitable pigmentary quality, rheological properties, and dispersibility.

Methods to improve rheological properties are known. For example, pigments can be treated with various additives, such as sulfonic acid and sulfonamide derivatives of various pigments. E.g., U.S. Pat. Nos. 3,418,322, 3,446,641, 4,088,507, 4,310,359, and 5,368,641 and British Patents 1,544,839 and 2,009,205.

Other pigment derivatives have also been disclosed for use as pigment additives. For example, pyrazolylmethyl quinacridone derivatives are described in U.S. Pat. No. 5,334,727. This patent, however, does not suggest the introduction of an amido or thioamido functionality between the heterocyclic ring and the methyl group, a critical feature of the present invention. Substituted benzamidomethyl quinacridones and structurally related phthalimidomethyl and sulfobenzimidomethyl quinacridones are described in U.S. Pat. Nos. 3,635,981, 4,197,404, 4,256,507, 4,439,240, 4,455,173, 4,478,968, 4,541,872, 4,844,742, 4,895,949, 5,194,088, 5,264,032, 5,286,863, 5,424,429, 5,453,151, and 5,457,203. These patents, however, disclose compounds in which amide carbonyl groups are attached only to benzene rings and do not suggest attachment to heterocycles, another critical feature of the present invention.

It has now surprisingly been found that pigment compositions having excellent pigmentary quality and rheological properties can be obtained by treating organic pigments with certain pigment derivatives bearing one or more heteroarylamidomethyl and/or heteroarylthioamidomethyl substituents in which the carbonyl function of each (thio)amidomethyl linking group is attached at a ring carbon atom of the heteroaromatic group. Such advantages are found even in comparison to benzamidomethyl quinacridones.

SUMMARY OF THE INVENTION

This invention relates to pigment compositions comprising an organic pigment treated with about 0.1 to about 20% by weight (preferably 1 to 10% by weight), based on the organic pigment, of a pigment derivative having the formula (I)

wherein
Q represents an organic pigment moiety,
X is O or S,
Het represents a heteroaromatic group attached at a ring carbon atom to the (thio)amidomethyl —CH$_2$—NH—CX— linking group, and
n is from 1 to 4.

This invention further relates to processes for preparing such pigment compositions and to the use of such pigment compositions in the pigmentation of paints, plastics, fibers, inks, and toners.

DETAILED DESCRIPTION OF THE INVENTION

Suitable organic pigments that can be treated by the process of the present invention include quinacridone, phthalocyanine, and perylene pigments, as well as other known organic pigments. Mixtures, including solid solutions, of such pigments are also suitable.

Quinacridone pigments are particularly suitable organic pigments. Quinacridones (which, as used herein, includes unsubstituted quinacridone, quinacridone derivatives, and solid solutions thereof) can be prepared by any of several methods known in the art but are preferably prepared by thermally ring-closing various 2,5-dianilinoterephthalic acid precursors in the presence of polyphosphoric acid. E.g., S. S. Labana and L. L. Labana, "Quinacridones" in *Chemical Review*, 67, 1–18 (1967), and U.S. Pat. Nos. 3,157,659, 3,256,285, 3,257,405, and 3,317,539. Suitable quinacridone pigments can be unsubstituted or substituted (for example, with one or more alkyl, alkoxy, halogens such as chlorine, or other substituents typical of quinacridone pigments).

Metal phthalocyanine pigments are also suitable organic pigments. Although copper phthalocyanines are preferred, other metal-containing phthalocyanine pigments, such as those based on zinc, cobalt, iron, nickel, and other such metals, may also be used. Suitable phthalocyanine pigments can be unsubstituted or partially substituted (for example, with one or more alkyl, alkoxy, halogens such as chlorine, or other substituents typical of phthalocyanine pigments). Crude phthalocyanines can be prepared by any of several methods known in the art but are preferably prepared by a reaction of phthalic anhydride, phthalonitrile or derivatives thereof with a metal donor, a nitrogen donor (such as urea or the phthalonitrile itself), and an optional catalyst, preferably in an organic solvent. E.g., W. Herbst and K. Hunger, *Industrial Organic Pigments* (New York: VCH Publishers, Inc., 1993), pages 418–427, H. Zollinger, *Color Chemistry* (VCH Verlagsgessellschaft, 1973), pages 101–104, and N. M. Bigelow and M. A. Perkins, "Phthalocyanine Pigments" in *The Chemistry of Synthetic Dyes and Pigments*, ed. H. A. Lubs (Malabar, Fla.: Robert E. Krieger Publishing Company, 1955), pages 584–587; see also U.S. Pat. Nos. 4,158,572, 4,257,951, and 5,175,282 and British Patent 1,502,884.

Perylenes, particularly the diimides and dianhydrides of perylene-3,4,9,10-tetracarboxylic acid, are also suitable organic pigments. Suitable perylene pigments can be unsubstituted or substituted (for example, with one or more alkyl, alkoxy, halogens such as chlorine, or other substituents typical of perylene pigments), including those substituted at imide nitrogen atoms with chemically reasonable groups such as alkyl. Crude perylenes can be prepared by methods known in the art. E.g., W. Herbst and K. Hunger, *Industrial Organic Pigments* (New York: VCH Publishers, Inc., 1993), pages 9 and 467–475, H. Zollinger, *Color Chemistry* (VCH Verlagsgessellschaft, 1973), pages 227–228 and 297–298, and M. A. Perkins, "Pyridines and Pyridones" in *The Chemistry of Synthetic Dyes and Pigments*, ed. H. A. Lubs (Malabar, Fla.: Robert E. Krieger Publishing Company, 1955), pages 481–482.

Other suitable organic pigments include dioxazines (that is, triphenedioxazines), 1,4-diketopyrrolopyrroles, anthrapyrimidines, anthanthrones, flavanthrones, indanthrones, isoindolines, isoindolinones, perinones, pyranthrones, thioindigos, 4,4'-diamino-1,1'-dianthraquinonyl, and azo compounds, as well as substituted derivatives.

The organic pigments can be treated according to the invention, for example, by mixing crude organic pigments with heteroarylamidomethyl and/or heteroarylthioamidomethyl pigment derivatives in a strong mineral acid, by wet or dry blending crude or finished organic pigments with the pigment derivatives, or by adding the pigment derivatives during pigment synthesis. It is also possible to treat organic pigments by conditioning in the presence of heteroarylamidomethyl and heteroarylthioamidomethyl pigment derivatives. Combinations of such methods are also suitable.

Suitable heteroarylamidomethyl and heteroarylthioamidomethyl pigment derivatives are compounds having the formula (I)

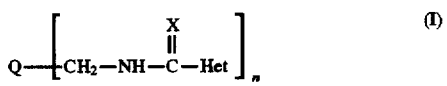

in which Q is represents an organic pigment moiety; X represents O (for amidomethyl linking groups) or S (for thioamidomethyl linking groups); Het represents a heteroaromatic group attached at a ring carbon atom to the carbonyl or thiocarbonyl function of the (thio)amidomethyl (i.e., —$CH_2$—NH—CX—) linking group; and n is from 1 to 4 (preferably 1 or 2, more preferably 1).

Pigment moiety Q can be derived from essentially any class of organic pigments, including quinacridones, phthalocyanines, perylenes (particularly the imides, diimides, anhydrides, and/or dianhydrides of perylene-3,4,9,10-tetracarboxylic acid), dioxazines (that is, triphenedioxazines), 1,4-diketopyrrolopyrroles, anthrapyrimidines, anthanthrones, flavanthrones, indanthrones, isoindolines, isoindolinones, perinones, pyranthrones, thioindigos, 4,4'-diamino-1,1'-dianthraquinonyl, or azo compounds, as well as substituted derivatives thereof. Suitable derivatives include those having one or more substituents that are typical of such pigments, such as $C_1$–$C_6$ alkyl, $C_1$–$C_6$ alkoxy, $C_5$–$C_7$ cycloalkyl, $C_5$–$C_7$ cycloalkoxy, $C_6$–$C_{10}$ aryl, $C_6$–$C_{10}$ aryloxy, $C_7$–$C_{16}$ aralkyl, $C_7$–$C_{16}$ aralkoxy, hydroxy, halogen, nitrile, carboxyl or amides thereof, sulfonyl (such as alkyl- and arylsulfonyl or sulfoxyl and amides thereof) groups or combinations thereof. Substituted derivatives of a pigment moiety Q can, of course, include those in which ring nitrogen atoms are substituted with chemically reasonable groups such as alkyl, cycloalkyl, aryl, or aralkyl. It is often desirable to use heteroarylamidomethyl and heteroarylthioamidomethyl pigment derivatives in which the pigment moiety Q is the same pigment type as the organic pigment being treated. However, it can often be desirable to use heteroarylamidomethyl and heteroarylthioamidomethyl pigment derivatives in which pigment moiety Q is a different pigment type from the organic pigment being treated. Preferred pigment derivatives are those derived from quinacridones, phthalocyanines, and perylenes.

Suitable heteroaromatic Het groups are aromatic species that contain one or more ring heteroatoms (selected from N, O and S) and that are attached at a ring carbon atom to the (thio)amidomethyl (i.e., —$CH_2$—NH—CX—) linking group. Examples of suitable heteroaromatic Het groups include those derived from pyrrole, imidazole, pyrazole, pyridine, pyrazine, pyrimidine, pyridazine, triazine, furan, thiophene, isoxazole, isothiazole, and furazan or derivatives thereof in which one or more ring atoms are substituted with $C_1$–$C_6$ alkyl, $C_1$–$C_6$ alkoxy, $C_5$–$C_7$ cycloalkyl, $C_5$–$C_7$ cycloalkoxy, $C_6$–$C_{10}$ aryl, $C_6$–$C_{10}$ aryloxy, $C_7$–$C_{16}$ aralkyl, $C_7$–$C_{16}$ aralkoxy, hydroxy, halogen, nitrile, carboxyl or amides thereof, sulfonyl (such as alkyl- and arylsulfonyl or sulfoxyl and amides thereof) groups or combinations thereof. Although some of the above Het groups, such as furan, may exhibit a low degree of aromaticity, such compounds are to be considered heteroaromatic for the purposes of this invention if no more than one hydrogen atom or substituent is attached to each ring atom.

As used herein, the term "$C_1$–$C_6$ alkyl" refers to straight or branched chain aliphatic hydrocarbon groups having from 1 to 6 carbon atoms. Examples of $C_1$–$C_6$ alkyl are methyl, ethyl, propyl, butyl, pentyl, hexyl, and the isomeric forms thereof. The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof. The term "$C_5$–$C_7$ cycloalkyl" refers to cycloaliphatic hydrocarbons groups having from 5 to 7 carbon atoms. Examples of $C_5$–$C_7$ cycloalkyl are cyclopentyl, cyclohexyl, and cycloheptyl. The term "$C_5$–$C_7$ cycloalkoxy" refers to cycloalkyloxy groups having from 5 to 7 carbon atoms. Examples of $C_5$–$C_7$ cycloalkoxy are cyclopentyloxy, cyclohexyloxy, and cycloheptyloxy. The term "$C_6$–C10 aryl" refers to phenyl and 1- or 2-naphthyl, as well as to phenyl and naphthyl groups substituted with alkyl, alkoxy, halogen, cyano, as defined herein. The term "$C_6$–C10 aryloxy" refers to phenoxy and 1- or 2-naphthoxy, in which the aryl portion can optionally be substituted as described above for "aryl." The term "$C_7$–C16 aralkyl" refers to $C_1$–$C_6$ alkyl substituted with $C_6$–$C_{10}$ aryl such that the total number of carbon atoms is from 7 to 16. Examples of $C_7$–$C_{16}$ aralkyl are benzyl, phenethyl, and naphthylmethyl. The term "$C_7$–$C_{16}$ aralkoxy" refers to $C_1$–$C_6$ alkoxy substituted with $C_6$–C10 aryl such that the total number of carbon atoms is from 7 to 16. An example of $C_7$–$C_{16}$ aralkoxy is benzyloxy. Examples of halogen are fluorine, chlorine, bromine, and iodine. Particularly preferred heteroaromatic Het groups are those derived from pyridine, furan, and thiophene.

Suitable, but generally less preferred, heteroaromatic Het groups include polyaromatic derivatives in which one or two pairs of adjacent ring atoms are fused with one or two aromatic rings (such as benzene or heteroaromatic analogs thereof) that can themselves be ring-substituted as described above or contain one or more ring heteroatoms selected from O, S, and N. Examples of suitable such polyaromatic Het groups include those based on indole, isoindole, and indolazine (i.e., benzo derivatives of pyrrole), carbazole (i.e., a dibenzo derivative of pyrrole), indazole, benzimidazole, quinoline, isoquinoline, and quinolazine (i.e., benzo derivatives of pyridine), quinazoline, quinoxaline, cinnoline, purine, benzofuran and isobenzofuran (i.e., benzo derivatives of furan), phenoxazine, benzothiazine, naphthothiophene, and thianthrene, as well as ring-substituted derivatives thereof.

The —$CH_2$—NH—CX— linking group can be either an amidomethyl (i.e., —$CH_2$—NH—CO—) group or a thioamidomethyl (i.e., —$CH_2$—NH—CS—) group.

Heteroarylamidomethyl and heteroarylthioamidomethyl pigment derivatives used according to the invention can be prepared by known methods, for example, by condensing the pigment to be derivatized with a mixture of a heteroarylcarboxamide or heteroarylthiocarboxamide or derivative thereof and formaldehyde or a functional equivalent (such as the polymeric form paraformaldehyde or a formaldehyde-producing compound such as trioxane) or with a corresponding N-methylol derivative of a heteroarylcarboxamide or heteroarylthiocarboxamide in the presence of a dehydrating agent at a temperature of about 0° to about 200° C. Suitable dehydrating agents include sulfuric acid, oleum, polyphosphoric acid, organic acids or their anhydrides, and mixtures thereof. Oleum is a particularly suitable condensing agent, especially for the less reactive pigments. The degree of substitution on the pigment molecule can be affected by various factors, such as the quantity of heteroaryl (thio)carboxamide, the reaction temperature, and length of reaction. The resultant heteroarylamidomethyl or heteroarylthioamidomethyl pigment derivatives can be isolated by adding the reaction mixture to a liquid in which the pigment derivative is completely or almost completely insoluble, preferably water or methanol or other lower aliphatic alcohols (such as ethanol, propanol, or butanol), as well as mixtures thereof. It can also be advantageous to include various additives, such as surfactants, in the liquid. The pigment derivatives are then isolated (for example, by filtration or other known methods) and washed until free of residual acid.

Particularly preferred pigment derivatives for treating pigments according to the invention are nicotinamidomethyl- and thionicotinamidomethylquinacridones having the formula (II)

solved ("pasted") or suspended ("swelled") in a strong mineral acid and then precipitated. A sufficient amount of mineral acid, preferably concentrated acid, is added to insure formation of an acidic solution or suspension within a reasonable amount of time. However, except for the requirement that the solution or suspension be acidic, the amount and concentration of acid is generally not critical. For example, more dilute acid may be used if the stirring time is extended, but use of the more concentrated acids is preferred for commercial applications. Suitable mineral acids include sulfuric acid and polyphosphoric acid, with sulfuric acid being preferred. It is particularly preferred to use at least 64% aqueous sulfuric acid in amounts of about 4 to about 15 parts by weight of acid relative to the total amount of crude organic pigment and pigment derivative. Although the dissolution rate of the mixture of crude pigment and pigment derivative in acid can be increased by warming the mixture (for example, to about 50° C.), it is generally preferable to dissolve the mixture in acid at or below 35° C. to minimize sulfonation (when using sulfuric acid) or degradation of the pigment or pigment derivative. After the acid treatment is completed, the pigment composition is precipitated by adding the strongly acidic solution to a liquid in which the pigment and pigment derivative are completely or almost

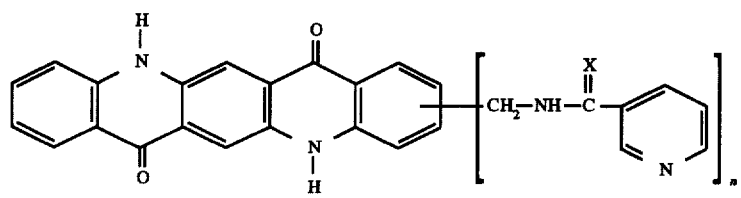

(II)

wherein X is O or S and n is 1 or 2;
2-furamidomethyl-substituted quinacridones having the formula (III)

completely insoluble, preferably water or methanol or other lower aliphatic alcohols (such as ethanol, propanol, or butanol), as well as mixtures thereof.

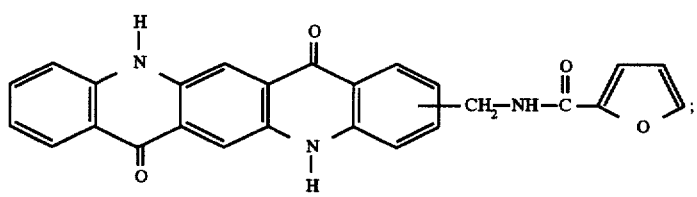

(III)

and 2-thiophenecarboxamidomethylquinacridones having the formula (IV)

When using sulfuric acid or oleum in the preparation of the heteroarylamidomethyl or heteroarylthioamidomethyl

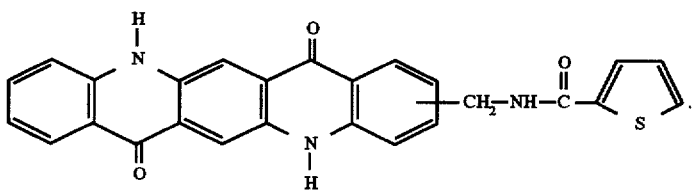

(IV)

Formulas (II), (III), and (IV) are not intended to indicate specific locations for the heteroaryl(thio)amidomethyl groups but rather to indicate that such groups are located in chemically reasonable positions of the quinacridone moiety.

Several methods for preparing the pigment compositions of the invention are known. In one preferred method, a crude organic pigment and a suitable heteroarylamidomethyl and/or heteroarylthioamidomethyl pigment derivative are dissolved ("pasted") or suspended ("swelled") in a strong pigment derivatives or of the ultimate pigment compositions, the pigment moiety can be sulfonated. Such sulfonated derivatives can be isolated as the free acid, an ammonium salt, or a metal salt (including, for example, alkali metal salts such as those of sodium or potassium, alkaline earth metal salts such as those of calcium or barium, and Group III metal salts such as those of aluminum).

In a second preferred method, an organic pigment is blended with a suitable heteroarylamidomethyl and/or heteroarylthioamidomethyl pigment derivative using wet or dry blending variants. The dry blending variant comprises (a) dry blending an organic pigment with about 0.1 to about 20% by weight (preferably 1 to 10% by weight), based on the organic pigment, of a pigment derivative of formula (I); and (b) collecting the pigment composition. The wet blending variant comprises (a) treating an organic pigment with (1) about 0.1 to about 20% by weight (preferably 1 to 10% by weight), based on the organic pigment, of a pigment derivative of formula (I), and (2) about 5 to about 20% by weight (preferably 5 to 15% by weight), based on the organic pigment, of a liquid in which the organic pigment is substantially insoluble, thereby forming a suspension of the treated pigment composition in the liquid; and (b) collecting the pigment composition. The liquid used for wet blending is a liquid in which the organic pigment is substantially insoluble, preferably water, a water-miscible solvent such as methanol or other lower aliphatic alcohols, or mixtures thereof. It is desirable, but not necessary, for the heteroarylamidomethyl or heteroarylthioamidomethyl pigment derivative to be at least partly insoluble in the liquid. Suitable liquids include water and/or water-miscible organic liquids; including, for example, lower aliphatic alcohols, such as methanol; ketones and ketoalcohols, such as acetone, methyl ethyl ketone, and diacetone alcohol; amides, such as dimethylformamide and dimethylacetamide; ethers, such as tetrahydrofuran and dioxane; alkylene glycols and triols, such as ethylene glycol and glycerol; and other such organic liquids known in the art. Other organic liquids can be used but are generally less preferred. The temperature at which wet blending is carried out is generally not critical but is usually maintained between about 5° C. and about 60° C. (preferably below the boiling point of the liquid).

In a third preferred method, which is particularly useful for preparing quinacridone pigment compositions, a suitable heteroarylamidomethyl and/or heteroarylthioamidomethyl pigment derivative is added during or even before synthesis of the organic pigment being treated such that the reaction and the treatment processes can take place in situ, at least in part, as the organic pigment is formed. For example, when preparing quinacridone pigments, a preferred preparative method comprises (a) heating, at a temperature of about 80° C. to about 145° C. (preferably 100° C. to 130° C.), a reaction mixture comprising (i) 2,5-dianilinoterephthalic acid, 2,5-dianilino-6,13-dihydroterephthalic acid, 2,5-dianilino-3,6-dioxo-1,4-cyclohexadiene-1,4-dicarboxylic acid, or a derivative thereof having one or more substituents in at least one aniline ring; a salt or ester of said acid or derivative thereof; or a mixture thereof, (ii) about 0.1 to about 15 percent by weight (preferably 0. 1 to 10 percent by weight), based on component (a)(i), of a suitable heteroarylamidomethyl and/or heteroarylthioamidomethyl pigment derivative, (iii) about 3 to about 20 parts by weight (preferably 3 to 10 parts by weight), per part of component (a)(i), of a dehydrating agent (preferably polyphosphoric acid), with the proviso that if either component (a)(i) or component (a)(ii) is a 2,5-dianilino-6,13-dihydroterephthalic acid or derivative thereof, reaction step (a) additionally comprises an oxidation step (which converts the initially formed dihydroquinacridone intermediate to the corresponding quinacridone); (b) drowning the reaction mixture from step (a) by adding said reaction mixture to about 3 to about 15 parts by weight (preferably 5 to 10 parts by weight), per part of component (a)(i), of a liquid in which the quinacridone pigment is substantially insoluble; and (c) isolating the quinacridone pigment.

Each of the above methods can be carried out in the presence of one or more additional pigment derivatives known in the art, particularly sulfonic acid and sulfonamide derivatives.

Regardless of which of the above methods is used, the resultant pigment composition is collected by methods known in the art, preferably filtration followed by a washing step to remove residual acid. Other collection methods known in the art, such as centrifugation or even simple decantation, are suitable but generally less preferred. The pigment composition is then dried for use or for further manipulation before use.

Pigment compositions according to the invention can be obtained by conditioning organic pigments in the presence of a heteroarylamidomethyl and/or heteroarylthioamidomethyl pigment derivative, carried out either instead of or in addition to the preparative methods described above. It is, of course, possible to include one or more additional pigment derivatives known in the art, particularly sulfonic acid and sulfonamide derivatives. Conditioning can be carried out using any of various methods known in the art, such as solvent treatment or milling in combination with solvent treatment. Final particle size of the pigment can be controlled by varying the method of aftertreatment. For example, pigments can be made more transparent by reducing the particle size or more opaque by increasing the particle size. Suitable milling methods include dry-milling methods such as sand-milling, ball-milling, and the like, with or without additives, or wet-milling methods such as salt-kneading, bead-milling, and the like in water or organic solvents, with or without additives.

Tinctorial strength and transparency of the pigment can also be affected by solvent treatment carried out by heating a dispersion of the pigment composition, often in the presence of additives, in a suitable solvent. Suitable solvents include organic solvents, such as alcohols, esters, ketones, and aliphatic and aromatic hydrocarbons and derivatives thereof, and inorganic solvents, such as water. Suitable additives include compositions that lessen or avoid flocculation, increase dispersion stability, and reduce coating viscosity, such as polymeric dispersants (or surfactants). E.g., U.S. Pat. Nos. 4,455,173, 4,758,665, 4,844,742, 4,895, 948, and 4,895,949.

During or after the optional conditioning step it is often desirable to use various other optional ingredients that provide improved properties. Examples of such optional ingredients include fatty acids having at least 12 carbon atoms, such as stearic acid or behenic acid, or corresponding amides, esters, or salts, such as magnesium stearate, zinc stearate, aluminum stearate, or magnesium behenate; quaternary ammonium compounds, such as tri[($C_1$–$C_4$ alkyl) benzyl]ammonium salts; plasticizers, such as epoxidized soya bean oil; waxes, such as polyethylene wax; resin acids, such as abietic acid, rosin soap, hydrogenated or dimerized rosin; $C_{12}$–$C_{18}$-paraffin-disulfonic acids; alkylphenols; alcohols, such as stearyl alcohol; amines, such as laurylamine or stearylamine; and aliphatic 1,2-diols, such as dodecane-1,2-diol. Such additives can be incorporated in amounts ranging from about 0.05 to 20% by weight (preferably 1 to 10% by weight), based on the amount of pigment.

Because of their light stability and migration properties, the pigment compositions according to the present invention are suitable for many different pigment applications. For example, pigment compositions according to the invention can be used as the colorant (or as one of two or more colorants) for very lightfast pigmented systems. Examples include pigmented mixtures with other materials, pigment formulations, paints, printing ink, colored paper, or colored macromolecular materials. The term "mixtures with other materials" is understood to include, for example, mixtures with inorganic white pigments, such as titanium dioxide or cement, or other inorganic pigments. Examples of pigment formulations include flushed pastes with organic liquids or pastes and dispersions with water, dispersants, and, where appropriate, preservatives. Examples of paints in which pigment compositions of the invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. The materials pigmented with the pigment compositions of the present invention can have any desired shape or form.

The pigment compositions prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastic materials).

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

EXAMPLES

Preparation of heteroarylamidomethylquinacridone and heteroarylthioamidomethylquinacridone derivatives Nicotinamidomethylquinacridone

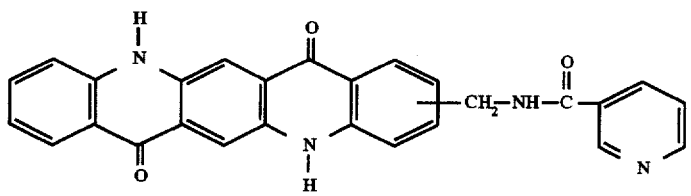

To 219 g of 100% sulfuric acid was slowly added with stirring 15.2 g of (0.10 mol) of N-hydroxymethylnicotinamide at a temperature below 25° C. To the acidic mixture was slowly added 31.2 g (0.10 mol) of quinacridone. The reaction mixture was then stirred for one hour at a temperature below 10° C., allowed to warm to room temperature and stirred for 18 hours. After being held at 60°–65° C. for three hours, the reaction mixture was cooled to 35° C. and slowly poured into two liters of iced water. The resultant slurry was stirred for 30 minutes while warming to 15° C. The solid was isolated by filtration and washed with water. The wet presscake was reslurried with water and heated to 60° C. for 30 minutes, after which the solid was isolated by filtration and washed with water. The wet presscake was dried in an oven at 60° C. to give 31.7 g of nicotinamidomethylquinacridone.

Di(nicotinamidomethyl)quinacridone

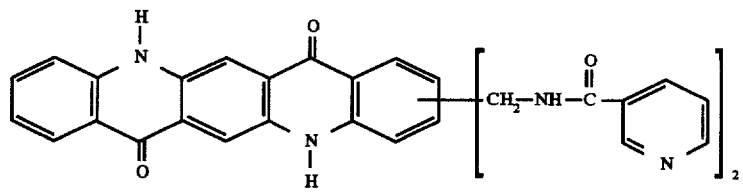

The method described above for the preparation of nicotinamidomethylquinacridone was repeated except for using 260 g of 100% sulfuric acid and 30.0 g (0.20 mol) of N-hydroxymethylnicotinamide. Di(nicotinamidomethyl)quinacridone (24.7 g) was thus obtained.

Thionicotinamidomethylquinacridone

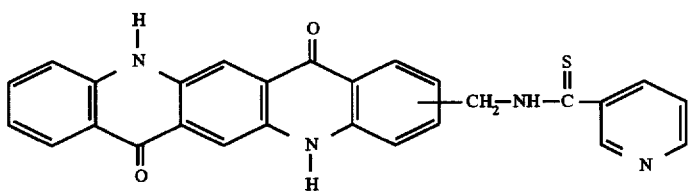

To 210 g of 100% sulfuric acid was added 14.1 g of (0.10 mol) of thionicotinamide over a period of 15 minutes at a temperature below 15° C. The acidic mixture was stirred for an additional 10 minutes, after which 3 g (0.10 mol) of paraformaldehyde was added while maintaining a temperature below 15° C. The reaction mixture was allowed to warm to room temperature, held at 20°–25° C. for two hours, and cooled to 10° C. To this mixture was added 31.2 g (0.10 mol) of quinacridone while the temperature was maintained below 15° C. The mixture was allowed to warm to room temperature, then held at 60°–65° C. for two hours. After being stirred at room temperature for 18 hours, the reaction mixture was slowly poured into two liters of iced water. The resultant slurry was allowed to warm to 20° C. and then stirred for one hour, after which the solid was isolated by filtration and washed with water. The wet presscake was reslurried with water and heated for 30 minutes at 60° C., after which the solid was again isolated by filtration and washed with water. The wet presscake was dried in an oven at 60° C. to give 34.8 g of thionicotinamidomethylquinacridone.

2-Furamidomethylquinacridone 2.4 g (0.08 mol) of paraformaldehyde was slowly added. The reaction mixture was heated at 60°–65° C. for five hours. The mixture was allowed to cool to room temperature, stirred at room temperature for 18 hours, and slowly poured into two liters of iced water. The resultant slurry was stirred for 30 minutes, after which the solid was isolated by filtration and washed with water. The wet presscake was reslurried with water and heated for 30 minutes at 60° C., after which the solid was isolated by filtration and washed with water. The wet presscake was dried in an oven at 60° C. to give 31.2 g of 2-furamidomethylquinacridone.

2-Thiophenecarboxamidomethylquinacridone

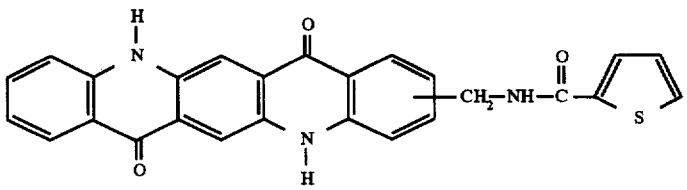

To 210 g of 100% sulfuric acid was added 12 g of (0.09 mol) of 2-thiophenecarboxamide at a temperature below 15° C. The acidic mixture was stirred for 15 minutes, after which 2.7 g (0.09 mol) of paraformaldehyde was slowly added. The reaction mixture was stirred for 15 minutes at a temperature below 10° C., allowed to stir at room temperature for two hours, and again cooled to 10° C. After adding 28.1 g (0.09 mol) of quinacridone, the reaction mixture was held at 60° C. for two hours. The mixture was then allowed to cool to room temperature, stirred at room temperature for 18 hours, and slowly poured into two liters of iced water while a temperature below 15° C. was maintained. The resultant slurry was stirred for one hour, after which the solid was

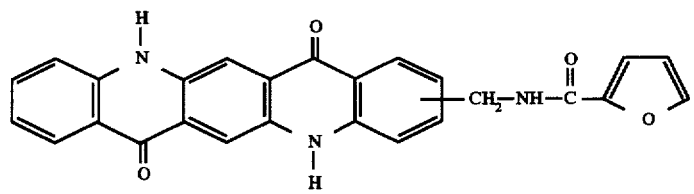

To 200 g of 96% sulfuric acid at a temperature below 25° C. was added 25 g of (0.08 mol) of quinacridone. The acidic mixture was stirred for 30 minutes, after which 9 g (0.08 mol) of 2-furamide (prepared by the method described in *J. Amer. Chem. Soc.*, 75, 2370–2372 (1953)) was added while the temperature was maintained below 35° C. The resultant mixture was stirred for an additional 30 minutes, after which isolated by filtration and washed with water. The wet presscake was reslurried with water and heated for 30 minutes at 60° C., after which the solid was again isolated by filtration and washed with water. The wet presscake was dried in an oven at 60° C. to give 39.3 g of 2-thiophenecarboxamidomethylquinacridone.

Examples 1–12

The preparation and testing of pigment compositions are described in Examples 1–12.

Differences in hue and chroma for pigments prepared according to the Examples were measured using an Applied Color System Spectral Sensor (Hunt Associated Laboratories, Fairfax, Va).

Water-based Paint Tests

Water-based paints tests were carried out using a waterborne base coat/solvent-borne clear coat system. Aqueous dispersions were prepared using a mixture of 12.4% AROLON® 559-G4-70 acrylic resin (Reichhold Chemicals, Inc.), 3.2% SOLSPERSE® 27000 hyperdispersant (Zeneca, Inc.), 1.6% 2-amino-2-methyl-1-propanol (Angus Chemical), and 18% pigment, which gave a pigment-to-binder ratio of 18:12 and a total solids content of 30%. The pigment-to-binder ratio was then reduced to 10:40 with additional AROLON® 559-G4-70 acrylic resin (total amount 26%) and 25% CYMEL® 325 melamine/formaldehyde resin (Cytec Industries), which gave a total solids content of 50%. Masstone and transparency measurements were made using films applied at 76 μm and 38 μm wet film thickness, respectively, and allowed to stand at room temperature for fifteen minutes and at 100° C. for five minutes. Clear coats containing a mixture of 80% of AROPLAZ® 1453-X-50 alkyd resin and 20% CYMEL® 325 melamine/formaldehyde resin at a total solids level of 57% were then applied over the base coat at a 76 μm wet film thickness allowed to stand at room temperature for fifteen minutes and at 121° C. for fifteen minutes.

Undertone tint paints were prepared from the reduced aqueous dispersions described above having a pigment-to-binder ratio of 10:40 by adding additional AROLON® 559-G4-70 acrylic resin, CYMEL®325 melamine/formaldehyde resin, and 35% TINT-AYD® CW-5003 white dispersion (Daniel Products Company), which gave a pigment-to-binder ratio of 1:1.1, a total solids content of 55%, and a TiO$_2$-to-pigment ratio of 90:10. Color measurements were made using films applied at 38 μm wet film thickness and allowed to stand at room temperature for fifteen minutes and at 100° C. for five minutes. Clear coats were then applied and baked as described above.

Metallic paints were prepared from the dispersion described above having a pigment-to-binder ratio of 18:12 using a water-dispersible aluminum pigment (available as HYDRO PASTE® 8726 from Silberline Manufacturing Co., Inc.), AROLON® 559-G4-70 acrylic resin, and CYMEL® 325 melamine/formaldehyde resin in quantities that provided a pigment-to-binder ratio of 1:2, an aluminum-to-pigment ratio of 20:80, and a total solids content of 43%. Color measurements were made using films applied at 38 μm wet film thickness and baked as described above. Clear coats were then applied and baked as described above.

Example 1 (comparison)

Pigmentary 2,9-dimethylquinacridone was prepared in the absence of a heteroarylamidomethyl or heteroarylthioamidomethyl pigment derivative according to the invention.

To 300 g of polyphosphoric acid (112% phosphoric acid) heated at 88° C. was added 68.2 g of 2,5-di(4-methylanilino) terephthalic acid over a period of 35 minutes, the temperature being maintained below 120° C. by adjustment of the addition rate. The reaction mixture was heated at 123° C. for two hours. The melt was cooled to 93° C. and then slowly poured into 494 g of methanol, the temperature being maintained below 64° C. by external cooling and adjustment of melt addition rate. The slurry was heated at reflux for one hour, cooled to below 60° C., diluted with water, collected by filtration, and washed with water until acid free. The resultant presscake was reslurried in water. After adjustment of the pH to greater than 7, 5.5 g of 50% sodium hydroxide was added and the resultant slurry was heated at 90° C. for one hour. The slurry was cooled, filtered, and washed with water until alkaline free, then reslurried in water. After adjustment of the pH to 9.5, the slurry was heated at 143° C. for two hours in a closed system (e.g., a pressure reactor), and cooled to 40° C. After the slurry was acidified to pH 3.3, an emulsion of 2.2 g of an anionic surfactant, 30 g of a petroleum distillate, and 80 g of water was added, and the slurry was stirred for three hours. The wet cake was dried in an oven at 60° C. to give approximately 60 g of 2,9-dimethylquinacridone as a magenta pigment.

Example 2

2,9-Dimethylquinacridone prepared according to the method of comparison Example 1 was dry-blended with 10% by weight of nicotinamidomethylquinacridone. A water-based paint prepared as described above exhibited reduced viscosity and a bluer tint compared to a paint prepared using the comparison 2,9-dimethylquinacridone pigment of Example 1.

Example 3 (comparison)

Example 2 was repeated except for using 10% by weight of phthalidomethylquinacridone. A water-based paint prepared as described above exhibited a slightly lighter masstone and a slightly decreased metallic brightness compared to a paint prepared using the pigment of Example 2 of the invention.

Example 4

2,9-Dimethylquinacridone prepared according to the method of comparison Example 1 was dry-blended with 10% by weight of di(nicotinamidomethyl)quinacridone. A water-based paint prepared as described above exhibited an increased metallic blueness and brightness compared to a paint prepared using the comparison 2,9-dimethylquinacridone pigment of Example 1.

Example 5

2,9-Dimethylquinacridone prepared according to the method of comparison Example 1 was dry-blended with 10% by weight of thionicotinamidomethylquinacridone. A water-based paint prepared as described above exhibited reduced viscosity compared to a paint prepared using the comparison 2,9-dimethylquinacridone pigment of Example 1.

Example 6

Example 5 was repeated except for using 5% by weight of thionicotinamidomethylquinacridone. A water-based paint prepared as described above exhibited viscosity and coloristic properties comparable to a paint prepared using the comparison 2,9-dimethylquinacridone pigment of Example 1.

Example 7

2,9-Dimethylquinacridone prepared according to the method of comparison Example 1 was dry-blended with 10% by weight of 2-furamidomethylquinacridone. A water-based paint prepared as described above exhibited reduced viscosity compared to a paint prepared using the comparison 2,9-dimethylquinacridone pigment of Example 1.

Example 8

Example 7 was repeated except for using 5% by weight of 2-furamidomethylquinacridone. A water-based paint prepared as described above exhibited reduced viscosity compared to a paint prepared using the comparison 2,9-dimethylquinacridone pigment of Example 1.

Example 9

Pigmentary 2,9-dimethylquinacridone was prepared exactly as described in comparison Example 1 except that 3.4 g of 2-furamidomethylquinacridone (5% by weight relative to the 2,5-di(4-methylanilino)-terephthalic acid) was included in the ring-closure reaction. A water-based paint prepared as described above exhibited a deeper, brighter, more transparent masstone and increased metallic blueness and brightness compared to a paint prepared using the comparison 2,9-dimethylquinacridone pigment of Example 1.

Example 10 (comparison)

Example 9 was repeated except for using 10% by weight of phthalidomethylquinacridone. A water-based paint prepared as described above exhibited a lighter masstone and a dramatically decreased tint and metallic brightness compared to a paint prepared using the pigment of Example 9 of the invention.

Example 11

2,9-Dimethylquinacridone prepared according to the method of comparison Example 1 was dry-blended with 10% by weight of 2-thiophenecarboxamidomethylquinacridone. A water-based paint prepared as described above exhibited reduced viscosity compared to a paint prepared using the comparison 2,9-dimethylquinacridone pigment of Example 1.

Example 12

Example 11 was repeated except for using 5% by weight of 2-thiophenecarboxamidomethylquinacridone. A water-based paint prepared as described above exhibited reduced viscosity compared to a paint prepared using the comparison 2,9-dimethylquinacridone pigment of Example 1.

What is claimed is:

1. A pigment composition comprising an organic pigment treated with about 0.1 to about 20% by weight, based on the organic pigment, of a pigment derivative having the formula

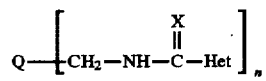

wherein

Q represents an organic pigment moiety,

X is O or S,

Het represents a heteroaromatic group attached at a ring carbon atom to the (thio)amidomethyl—$CH_2$—NH—CX— linking group, and n is from 1 to 4.

2. A pigment composition according to claim 1 wherein the organic pigment is treated with 1 to 10% by weight of the pigment derivative.

3. A pigment composition according to claim 1 wherein Het is a pyrrole, imidazole, pyrazole, pyridine, pyrazine, pyrimidine, pyridazine, triazine, furan, thiophene, isoxazole, isothiazole, or furazan or derivative thereof in which one or more ring atoms are substituted with $C_1$–$C_6$ alkyl, $C_1$–$C_6$ alkoxy, $C_5$–$C_7$ cycloalkyl, $C_5$–$C_7$ cycloalkoxy, $C_6$–$C_{10}$ aryl, $C_6$–$C_{10}$ aryloxy, $C_7$–$C_{16}$ aralkyl, $C_7$–$C_{16}$ aralkoxy, hydroxy, halogen, nitrile, carboxyl or an amide thereof, sulfonyl, or combinations thereof.

4. A pigment composition according to claim 1 wherein the pigment derivative is (a) a nicotinamidomethylquinacridone or thionicotinamidomethylquinacridone having the formula

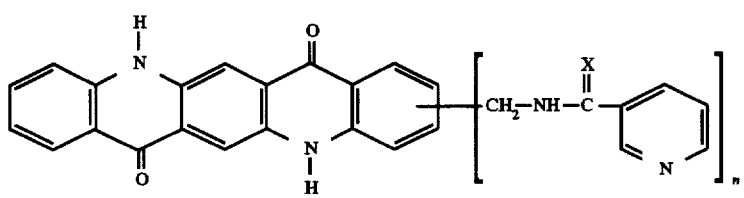

wherein X is O or S and n is 1 or 2;

(b) a 2-furamidomethyl-substituted quinacridone having the formula

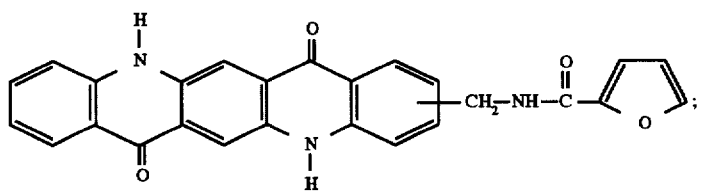

or (c) a 2-thiophenecarboxamidomethylquinacridone having the formula

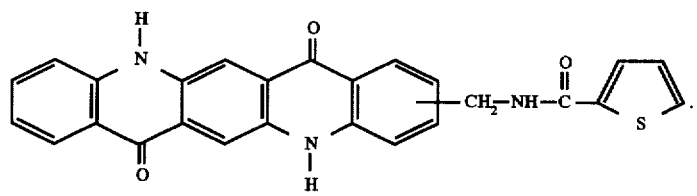

5. A pigment composition according to claim 4 wherein the organic pigment is a quinacridone.

6. A pigment composition according to claim 1 wherein the organic pigment is treated by (a) mixing a crude organic pigment with a heteroarylamidomethyl and/or heteroarylthioamidomethyl pigment derivative in a strong mineral acid, (b) wet or dry blending a crude or finished organic pigment with a heteroarylamidomethyl and/or heteroarylthioamidomethyl pigment derivative, (c) adding a heteroarylamidomethyl and/or heteroarylthioamidomethyl pigment derivative during synthesis of the organic pigment, (d) conditioning an organic pigment in the presence of a heteroarylamidomethyl and/or heteroarylthioamidomethyl pigment derivative, or (e) a combination of one or more of methods (a), (b), (c), and (d).

7. A pigmented paint containing a pigment composition according to claim 1.

8. A pigmented plastic containing a pigment composition according to claim 1.

9. An ink containing as pigment a pigment composition according to claim 1.

10. A toner containing as pigment a pigment composition according to claim 1.

* * * * *